H. M. WARREN
April 11, 1933. CONTAINER Re. 18,792
Original Filed Oct. 6, 1930 2 Sheets-Sheet 1
Fig. 1.
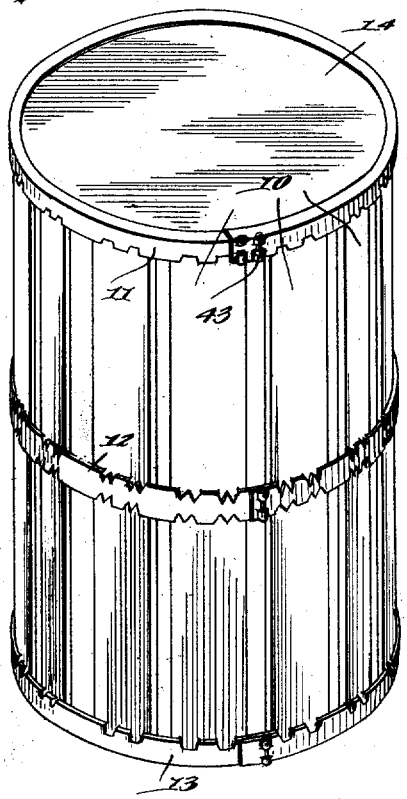
Fig. 2.
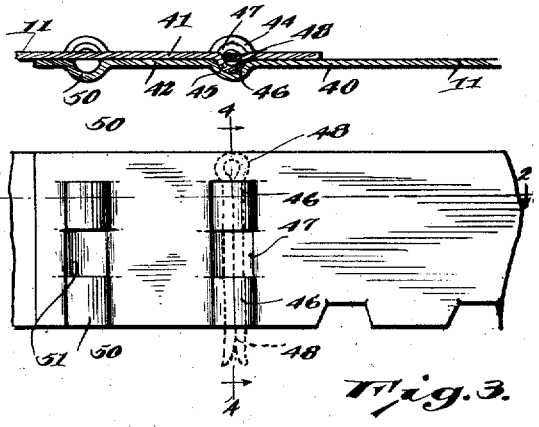
Fig. 3.
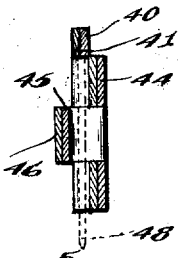
Fig. 4.
Fig. 5.
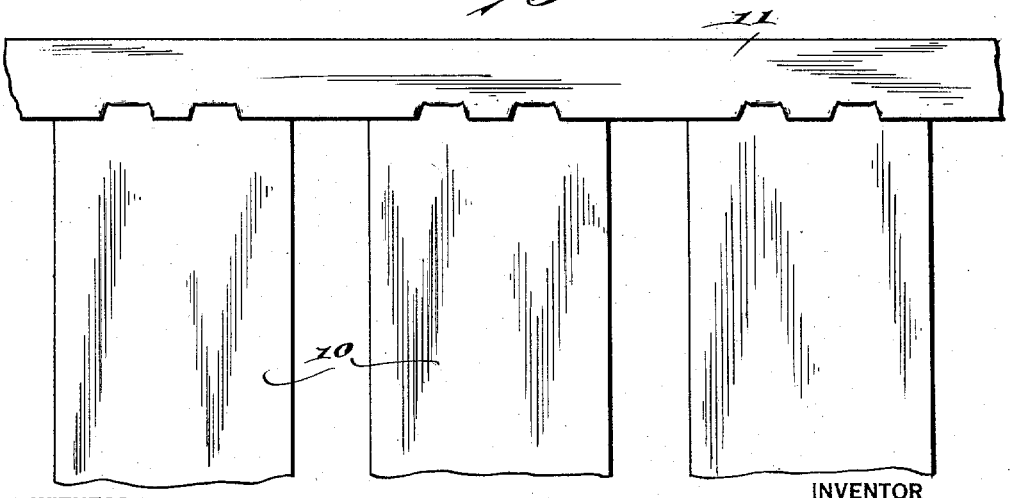
WITNESS
C. Howard Mann
INVENTOR
H. M. Warren,
BY
Mann & Co
ATTORNEY

H. M. WARREN

April 11, 1933. CONTAINER Re. 18,792

Original Filed Oct. 6, 1930 2 Sheets-Sheet 2

WITNESS
C. Howard Mann

INVENTOR
H. M. Warren
BY
Munn & Co.
ATTORNEY

Reissued Apr. 11, 1933

Re. 18,792

UNITED STATES PATENT OFFICE

HAROLD M. WARREN, OF ST. PETERSBURG, FLORIDA, ASSIGNOR TO STEEL-BOUND CONTAINER CORPORATION, OF ST. PETERSBURG, FLORIDA, A CORPORATION

CONTAINER

Original No. 1,846,291, dated February 23, 1932, Serial No. 486,751, filed October 6, 1930. Application for reissue filed March 24, 1932. Serial No. 601,064.

This invention relates to containers for transporting fruits or vegetables.

An object of the invention is the provision of a container which is formed of staves made of wood or some form of composition material which are bound together with hoops having means for securing the staves to the hoops and for securing the heads and bottoms of the container in rigid position.

Another object of the invention is the provision of a container formed of staves and hoops in which the staves, tops and bottoms are bound together without the use of the usual securing means, the whole when completed forming a firm and durable structure.

A further object of the invention is the provision of a container constructed of staves which are bound together by metal hoops having prongs penetrating the staves, the end hoops having lugs or flanges for retaining the tops and bottoms in position.

A still further object of the invention is the provision of a container formed of staves bound together by hoops in which the ends of the hoops are releasably connected together while the staves are secured to the hoops by integrally formed penetrating prongs.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of a container constructed in accordance with the principles of my invention;

Figure 2 is a fragmentary plan view, showing the connection between the free ends of the hoops;

Figure 3 is a view in elevation of the construction shown in Figure 2;

Figure 4 is a transverse vertical section, taken along the line 4—4 of Figure 3;

Figure 5 is a fragmentary plan view, showing the staves of the container bound together in a flat sheet;

Referring more particularly to the drawings, 10 designates a plurality of staves which are bound together by means of metal hoops 11, 12 and 13. A top 14 is secured in position by means of the hoops 11 while a bottom, not shown and which is similar to the construction of the top 14, is held in position by the hoop 13.

The hoops 11 are secured to the staves 10 in any approved manner either after the hoops have been punched to form penetrating prongs or this may be done simultaneously and any number of hoops may be employed dependent upon the size of the containers so that while I have shown three hoops on the container in Figure 3 it may only be necessary to employ two because of the smallness of the container or more than two hoops can be utilized for the purpose.

The hoops 11, 12 and 13 may be run through a machine such as described in application Serial No. 464,034, filed June 26, 1930, by James D. Brooks, in which dies are provided for stamping the penetrating prongs, for forcing the prongs through the staves, and for swaging the free ends of the prongs in clamping relation with the staves.

Figure 7:
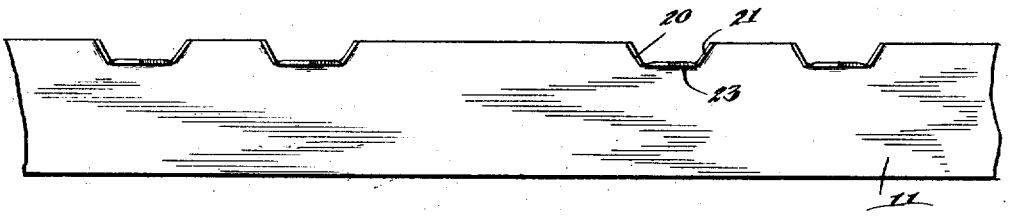
Figure 7 is a view in elevation of a portion of hoop after the prongs have been cut.
Figure 8:
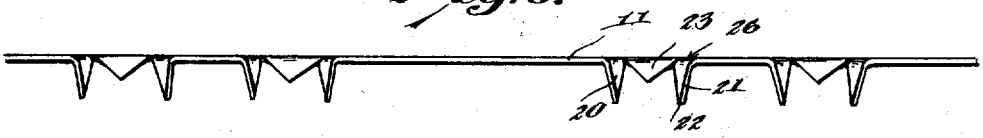
Figure 8 is a top plan view of the portion of hoop shown in Figure 7.
Figure 9:
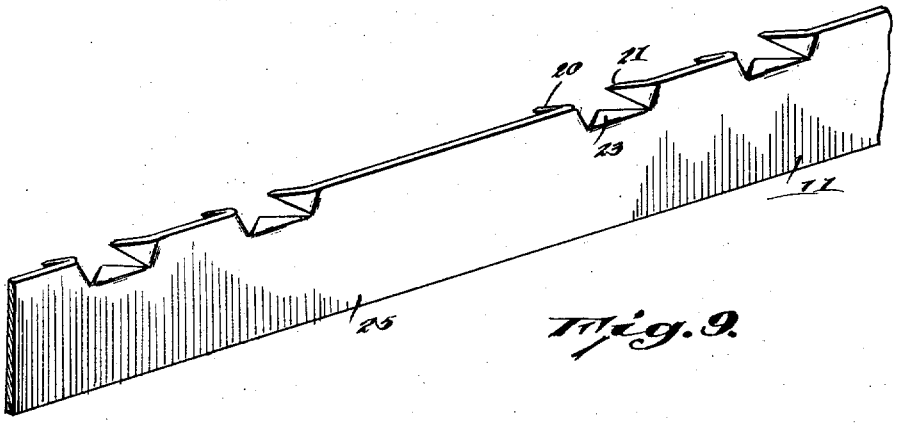
Figure 9 is a view in perspective of the portion of hoop shown in Figures 7 and 8.

Each of the hoops as shown in Figures 7 and 9 inclusive consists of a ribbon of metal having stave penetrating prongs 20 and 21 which are forced through the staves and the free ends 22 are bent over upon the inside of the staves for the purpose of securing the hoops to the staves. A third prong 23 is formed intermediate the prongs 20 and 21 and is forced into the staves, and this prong provides an anchoring means to prevent shifting of the hoops and cooperates with the prongs 20 and 21 for securely attaching the staves to the hoop. It will be noted however that the prongs 23 merely penetrate the staves. Where the staves are of wood, it is apparent and natural that the grain will run generally longitudinally of the stave, and that the prongs 20 and 21 normally will be substantially parallel to and between grains and the anchor 23 will bite into the wood across the grain.

Figure 6:
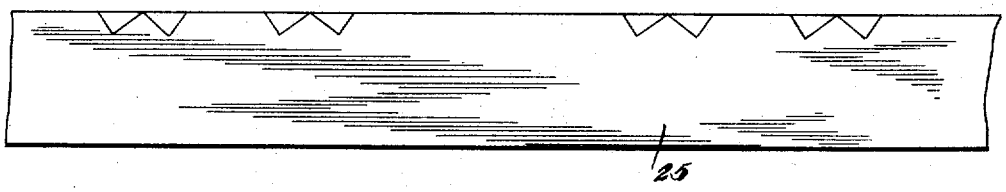
Figure 6 is a plan view of a hoop before it has been cut to provide penetrating prongs.

The blank 25 shown in Figure 6, discloses more clearly the method of cutting the three prongs in an economical manner, and the prongs are so designed that all portions of the metal hoops will be employed for the purpose of securing the staves to the hoops, and further the prongs are so designed that they will be of sufficient length to not only penetrate the staves but sufficient metal will project beyond the inner faces of the staves so that the projecting ends may be swaged over for rigidly binding the staves to the hoops. It will also be seen that the anchoring prongs 23 are in longitudinal alinement as are the points 22 of the prongs 20 and 21.

Those portions of the prongs as indicated at 28 where the prongs join the hoops 11 are inclined at such an angle that the points 22 will be in longitudinal alinement. Furthermore this angular relation, as indicated at 26 between the inner ends of the prongs and the hoops is such that the prongs will have the proper length to not only penetrate the staves but that the free end of the prongs may be swaged over for rigidly securing the staves to the hoops.

It will be appreciated that hoops employed in connection with these containers are not of the continuous type, since the hoops are formed from ribbons of metal which are passed through a stamping and die machine not only for cutting the prongs but for securing the staves to the hoops by means of the prongs. Therefore, it will be appreciated that means is employed in the present case connecting the free ends of the straps together, as shown more particularly in Figures 1 to 4 inclusive.

The free ends 40 and 41 of the straps 11, 12 and 13 are overlapped, as shown in Figure 1. However the ends of the hoops or straps 11 and 13 have a supplemental portion 42 which is extended beyond the connecting means generally designated by the numeral 43 for a purpose which will be presently explained. The end 41 of either strap 11 or 13 has an indented portion 44 between its opposite edges which is located between a pair of curved members 45 projecting outwardly. The end 40 of the strap 11 has complementary formed members 46 and 47 which fit into the members 44 and 45 respectively so that when a cotter pin 48 is forced down between these interfitting portions the ends of the straps will be secured together.

The extended portion 42 of the end 40 of the strap 11 is provided with a pair of curved members 50 and an indented portion 51 which is curved in the opposite direction to the members 50. These members are provided for the purpose of releasing the strap 11 sufficiently to permit the removal of the top 14 when it is desired to remove the vegetables or fruit within the container or when it is desired to display the ingredients in the container. At this time the cotter pin 48 is removed from its normal securing position, and the members 50 and 51 are seated within the members 44 and 45 and the pin 48 is then inserted in position whereby the top of the container will be held in position where it is possible to remove the top 14.

The upper strap 11 and the lower strap 13 are each provided with an inturned flange 60 which engages the outer surface of the top 14 for rigidily securing the top and bottom in position. However, instead of the flange 60, lugs may be punched laterally from the outer edges of the straps 11 and 13 for engaging the top and bottom to retain said members in position.

The overlapping portions of the end straps are likewise inturned at their outer edges thereby forming a continuation of the flange 60.

As shown more particularly in Figure 1 the inner edge of the top 14 rests upon the top 61 of the staves 10 so that when the flange 60 is forced downwardly upon said top or bottom it will be rigidly secured in place. By releasing the connecting members 43 of the strap 11 the upper portions of the staves may be forced apart sufficiently to permit the edges of the top 14 to clear the inner periphery of the flange 60 when the cotter pin 48 has locked the complemental members 50 and 51 with the complemental members 44 and 45.

If desired the end 41 of the strap 11 may be punched to provide the semi-circular member 62 which will receive the semi-circular member 51 in order to provide for close contact of the extension 42 with the end 41 of the strap 11.

I claim:

1. A flat comprising a fiber wall member, a thin flat metal binding strip located at one face and along one edge of said wall member, means holding said strip to said wall member, and a relatively shallow anchoring means adjacent the holding means presenting a relatively broad resistance surface substantially parallel to the longitudinal axis of the strip.

2. A container of the wrap around type, comprising a fiber wall member, thin flat metal binding strips adjacent opposite, end edges of the wall, securing means projecting from the strips and penetrating the wall member for securing the strips to the latter, the free end of such means being clinched over the inner face of the wall, the outer edges of the strips adjacent the opposite edges of the wall member projecting beyond said opposite edges, closures for the open ends of the container, the projecting edges of the metal strips being swaged over the closures and a relatively shallow, non-continuous anchoring means adjacent the securing means biting into the wall member and presenting a relatively broad resistance surface substantially perpendicular to the height of the container and acting in opposition to the swaged over portions of the metal strips for aiding in maintaining the metal strips in position.

3. A container of the wrap around type comprising a fiber wall member, a thin flat metal binding strip adjacent an end edge of the wall, securing means projecting from the strip and penetrating the wall for securing the strip to the latter, the outer edge of the strip adjacent the end edge of the wall projecting beyond the latter edge, a closure for the open end of the container at such end of the wall member, the projecting edge of the strip being swaged over the closure, and a relatively shallow, non-continuous anchoring means adjacent the securing means, biting into the wall member and presenting a relatively broad resistance surface substantially perpendicular to the height of the container and acting in opposition to the swaged over portions of the strip for aiding in maintaining the strip in position.

4. A container of the wrap around type comprising a wooden wall member, a thin flat metal binding strip adjacent an end edge of the wall, securing means projecting from the strip and penetrating the wall for securing the strip to the latter, the outer edge of the strip projecting beyond the end edge of the wall, a closure for the open end of the container at such end of the wall member, the projecting edge of the strip being swaged over the closure, and non-continuous anchoring means adjacent the securing means, biting into the wall member across the grain thereof, to present a relatively broad resistance surface substantially perpendicular to the height of the container and acting in opposition to the swaged over portions of the strip for aiding in maintaining the strip in position, said securing means being generally directed into the wall member parallel to the grain so as normally to be between grains.

5. A flat comprising a wooden wall member, a thin flat metal binding strip located at one face and along one edge of said wall member, means holding said strip to said wall member, and a relatively shallow non-continuous anchoring means adjacent the holding means, presenting a relatively broad resistance surface substantially parallel to the longitudinal axis of the strip and biting into the wall member across the grain thereof.

6. A flat comprising a wooden wall member, a thin flat metal binding strip located at one face and along one edge of said wall member, means holding said strip to said wall member, and a relatively shallow non-continuous anchoring means adjacent the holding means, presenting a relatively broad resistance surface substantially parallel to the longitudinal axis of the strip and biting into the wall member across the grain thereof, said holding means being directed into the wall member so as normally to be between grains.

HAROLD M. WARREN.